United States Patent
Chinniah et al.

(10) Patent No.: US 7,554,742 B2
(45) Date of Patent: Jun. 30, 2009

(54) LENS ASSEMBLY

(75) Inventors: Jeyachandrabose Chinniah, Belleville, MI (US); Amir P. Fallahi, W. Bloomfield, MI (US); Edwin M. Sayers, Saline, MI (US); Christopher W. Gattis, Livonia, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 124 days.

(21) Appl. No.: 11/736,358

(22) Filed: Apr. 17, 2007

(65) Prior Publication Data

US 2008/0259630 A1 Oct. 23, 2008

(51) Int. Cl.
*G02B 27/30* (2006.01)
*G02B 5/04* (2006.01)

(52) U.S. Cl. .................... 359/641; 359/834
(58) Field of Classification Search .......... 359/641
See application file for complete search history.

(56) References Cited

U.S. PATENT DOCUMENTS

| | | | |
|---|---|---|---|
| 2,215,900 A | 9/1940 | Bitner | |
| 2,224,178 A | 12/1940 | Bitner | |
| 2,254,961 A | 9/1941 | Harris | |
| 2,254,962 A | 9/1941 | Harris et al. | |
| 2,387,816 A | 10/1945 | Wagner | |
| 3,593,014 A | 7/1971 | Vesely | |
| 3,700,883 A | 10/1972 | Donohue et al. | |
| 4,344,110 A | 8/1982 | Ruediger | |
| 4,389,698 A | 6/1983 | Cibie | |
| 4,577,260 A | 3/1986 | Tysoe | |
| 4,613,927 A | 9/1986 | Brandt | |
| 4,642,740 A | 2/1987 | True | |
| 4,704,661 A | 11/1987 | Kosmatka | |
| 4,753,520 A | 6/1988 | Silverglate | |
| 4,770,514 A | 9/1988 | Silverglate | |
| 4,826,273 A | 5/1989 | Tinder et al. | |

(Continued)

FOREIGN PATENT DOCUMENTS

DE 3317519 A1 11/1948

(Continued)

OTHER PUBLICATIONS

Product Brochure—The LED Light.com; Luxeon LEDs, Assemblies, and Accessories; pp. 1-4, Jul. 27, 2005.

(Continued)

*Primary Examiner*—Ricky L Mack
*Assistant Examiner*—James C Jones
(74) *Attorney, Agent, or Firm*—Brinks Hofer Gilson & Lione (57) ABSTRACT

A lens assembly for use with a light source and including an inner lens and a light directing portion. The inner lens collects light rays from the light source through a light-collecting face and emits at least a portion of the light rays radially through a series of collimators. The light directing portion may be an outer lens having light-collecting faces and light-distributing faces. The light-collecting faces correspond with the collimators and distribute the light rays through light-distributing faces. The light direction portion may alternatively be an outer reflector. The reflector has a plurality of light-reflecting surfaces, corresponding to the collimators, and configured to reflect the light rays emitted from the collimators.

16 Claims, 8 Drawing Sheets

U.S. PATENT DOCUMENTS

| | | | |
|---|---|---|---|
| 4,927,248 A | 5/1990 | Sakakibara et al. | |
| 4,958,263 A | 9/1990 | Davenport et al. | |
| 4,972,302 A | 11/1990 | Masuyama et al. | |
| 5,042,928 A | 8/1991 | Richards | |
| 5,081,564 A | 1/1992 | Mizoguchi et al. | |
| 5,161,059 A | 11/1992 | Swanson et al. | |
| 5,184,883 A | 2/1993 | Finch et al. | |
| 5,276,594 A | 1/1994 | Burkett et al. | |
| 5,311,410 A | 5/1994 | Hsu et al. | |
| 5,343,330 A | 8/1994 | Hoffman et al. | |
| 5,369,554 A | 11/1994 | Erion | |
| 5,434,756 A | 7/1995 | Hsu et al. | |
| 5,440,456 A | 8/1995 | Bertling et al. | |
| 5,485,317 A | 1/1996 | Perissinotto et al. | |
| 5,526,190 A | 6/1996 | Hubble, III et al. | |
| 5,532,909 A | 7/1996 | Ban et al. | |
| 5,567,031 A | 10/1996 | Davenport et al. | |
| 5,577,492 A | 11/1996 | Parkyn, Jr. et al. | |
| 5,608,290 A | 3/1997 | Hutchisson et al. | |
| 5,642,933 A | 7/1997 | Hitora | |
| 5,757,557 A | 5/1998 | Medvedev et al. | |
| 5,775,792 A | 7/1998 | Wiese | |
| 5,813,743 A | 9/1998 | Naka | |
| 5,898,267 A | 4/1999 | McDermott | |
| 5,914,760 A | 6/1999 | Daiku | |
| 5,926,320 A | 7/1999 | Parkyn, Jr. et al. | |
| 5,931,576 A | 8/1999 | Kreysar et al. | |
| 5,947,587 A | 9/1999 | Keuper et al. | |
| 6,007,226 A | 12/1999 | Howard | |
| 6,075,652 A | 6/2000 | Ono et al. | |
| 6,097,549 A | 8/2000 | Jenkins et al. | |
| 6,123,440 A | 9/2000 | Albou | |
| 6,129,447 A | 10/2000 | Futami | |
| 6,139,147 A | 10/2000 | Zhang | |
| 6,152,588 A | 11/2000 | Scifres | |
| 6,168,302 B1 | 1/2001 | Hulse | |
| 6,191,889 B1 | 2/2001 | Maruyama | |
| 6,206,554 B1 | 3/2001 | Schuster et al. | |
| 6,283,623 B1 | 9/2001 | Chinniah et al. | |
| 6,292,293 B1 | 9/2001 | Chipper | |
| 6,305,830 B1 | 10/2001 | Zwick et al. | |
| 6,327,086 B1 | 12/2001 | Unno | |
| 6,334,702 B1 | 1/2002 | Albou | |
| 6,352,359 B1 | 3/2002 | Shie et al. | |
| 6,356,394 B1 | 3/2002 | Glienicke | |
| 6,367,950 B1 | 4/2002 | Yamada et al. | |
| 6,367,954 B1 | 4/2002 | Futami | |
| 6,367,957 B1 | 4/2002 | Hering et al. | |
| 6,402,355 B1 | 6/2002 | Kinouchi | |
| 6,431,738 B1 | 8/2002 | Kondo et al. | |
| 6,447,155 B2 | 9/2002 | Kondo et al. | |
| 6,454,443 B2 | 9/2002 | Natsume et al. | |
| 6,462,874 B1 | 10/2002 | Soskind | |
| 6,481,864 B2 | 11/2002 | Hosseini et al. | |
| 6,527,411 B1 | 3/2003 | Sayers | |
| 6,536,918 B1 | 3/2003 | Boroczki et al. | |
| 6,536,921 B1 | 3/2003 | Simon | |
| 6,543,923 B2 | 4/2003 | Tamai | |
| 6,547,423 B2 | 4/2003 | Marshall et al. | |
| 6,560,038 B1 | 5/2003 | Parkyn, Jr. et al. | |
| 6,604,843 B2 | 8/2003 | Shpizel | |
| 6,616,299 B2 | 9/2003 | Martineau | |
| 6,616,305 B1 | 9/2003 | Simon | |
| 6,623,132 B2 | 9/2003 | Lekson et al. | |
| 6,626,565 B2 | 9/2003 | Ishida | |
| 6,679,618 B1 | 1/2004 | Suckow et al. | |
| 6,698,908 B2 | 3/2004 | Sitzema, Jr. et al. | |
| 6,724,543 B1 | 4/2004 | Chinniah et al. | |
| 6,726,346 B2 | 4/2004 | Shoji | |
| 6,755,556 B2 | 6/2004 | Gasquet et al. | |
| 6,757,109 B2 | 6/2004 | Bos | |
| 6,783,269 B2 | 8/2004 | Pashley et al. | |
| 6,805,456 B2 | 10/2004 | Okuwaki | |
| 6,807,019 B2 | 10/2004 | Takeuchi et al. | |
| 6,814,475 B2 | 11/2004 | Amano | |
| 6,814,480 B2 | 11/2004 | Amano | |
| 6,819,505 B1 | 11/2004 | Cassarly et al. | |
| 6,819,506 B1 | 11/2004 | Taylor et al. | |
| 6,824,284 B2 | 11/2004 | Chinniah et al. | |
| 6,899,443 B2 | 5/2005 | Rizkin et al. | |
| 6,910,783 B2 | 6/2005 | Mezei et al. | |
| 7,160,010 B1 | 1/2007 | Chinniah et al. | |
| 2002/0008969 A1 | 1/2002 | Mabuchi et al. | |
| 2002/0080615 A1 | 6/2002 | Marshall et al. | |
| 2002/0093820 A1 | 7/2002 | Pederson | |
| 2002/0126400 A1 | 9/2002 | Muller-Rissmann et al. | |
| 2002/0136022 A1 | 9/2002 | Nakata | |
| 2002/0167820 A1 | 11/2002 | Haering et al. | |
| 2002/0172052 A1 | 11/2002 | Perlo et al. | |
| 2003/0007359 A1* | 1/2003 | Sugawara et al. | 362/326 |
| 2003/0067784 A1 | 4/2003 | Erber | |
| 2003/0075167 A1 | 4/2003 | Minano Dominguez et al. | |
| 2003/0099113 A1 | 5/2003 | Gebauer et al. | |
| 2003/0123159 A1 | 7/2003 | Morita et al. | |
| 2003/0123262 A1 | 7/2003 | Suehiro et al. | |
| 2003/0218882 A1 | 11/2003 | Wirth et al. | |
| 2003/0235050 A1 | 12/2003 | West et al. | |
| 2004/0012976 A1 | 1/2004 | Amano | |
| 2004/0070855 A1 | 4/2004 | Benitez et al. | |
| 2004/0109326 A1 | 6/2004 | Uhl | |
| 2004/0114393 A1 | 6/2004 | Galli | |
| 2004/0120157 A1 | 6/2004 | Bottesch et al. | |
| 2004/0130904 A1 | 7/2004 | Yamada et al. | |
| 2004/0141323 A1 | 7/2004 | Aynie et al. | |
| 2004/0145899 A1 | 7/2004 | Riebling et al. | |
| 2004/0150991 A1 | 8/2004 | Ouderkirk et al. | |
| 2004/0179349 A1 | 9/2004 | Buelow, II et al. | |
| 2004/0202003 A1 | 10/2004 | Lyst, Jr. | |
| 2004/0212998 A1 | 10/2004 | Mohacsi | |
| 2004/0218392 A1 | 11/2004 | Leadford | |
| 2004/0257827 A1 | 12/2004 | Ishida et al. | |
| 2004/0264199 A1 | 12/2004 | Shu et al. | |
| 2005/0007753 A1 | 1/2005 | Van Hees et al. | |
| 2005/0024744 A1 | 2/2005 | Falicoff et al. | |
| 2005/0057938 A1 | 3/2005 | Mertens et al. | |
| 2005/0078483 A1 | 4/2005 | Bernard et al. | |
| 2005/0083699 A1 | 4/2005 | Rhoades et al. | |
| 2007/0109791 A1 | 5/2007 | Chinniah et al. | |
| 2007/0121331 A1 | 5/2007 | Chinniah et al. | |

FOREIGN PATENT DOCUMENTS

| | | |
|---|---|---|
| JP | 05205511 | 8/1993 |
| JP | 06260006 | 9/1994 |
| JP | 02001257381 | 9/2001 |
| WO | WO 89/08223 | 8/1989 |

OTHER PUBLICATIONS

Product Brochure—Carclo Precision Optics; LED Optics; 2 Pages.

* cited by examiner

LENS ASSEMBLY

BACKGROUND

1. Field of the Invention

The present invention generally relates to lighting systems. More particularly, the invention relates to lens assemblies that collect and direct light from light sources, such as light-emitting diodes.

2. Description of Related Art

Light-emitting diodes (LEDs) are fast becoming a preferable light source for automotive lighting applications, as they consume less power than other forms of light sources, but still provide light output that is acceptable for automotive applications. Currently, multiple low-powered light-emitting diodes (LEDs) are used as light sources to perform many of the signal lighting applications in motor vehicles. Use of several LEDs in a single application provides the desired styling themes and lit appearances. Using multiple LEDs, however, increases complexity of electronics and packaging, Which increases the overall cost of the lighting systems.

In order to employ LEDs in automotive applications, high levels of efficiency must be obtained in both light collection and light distribution. Therefore, reflectors, lenses, and light pipes have been used to collect and distribute the light from one or more LEDs. Unfortunately, the desired level of light intensity has not been effectively produced utilizing the combination of an LED light source and such reflectors, lenses, or light pipes.

Figure 1:
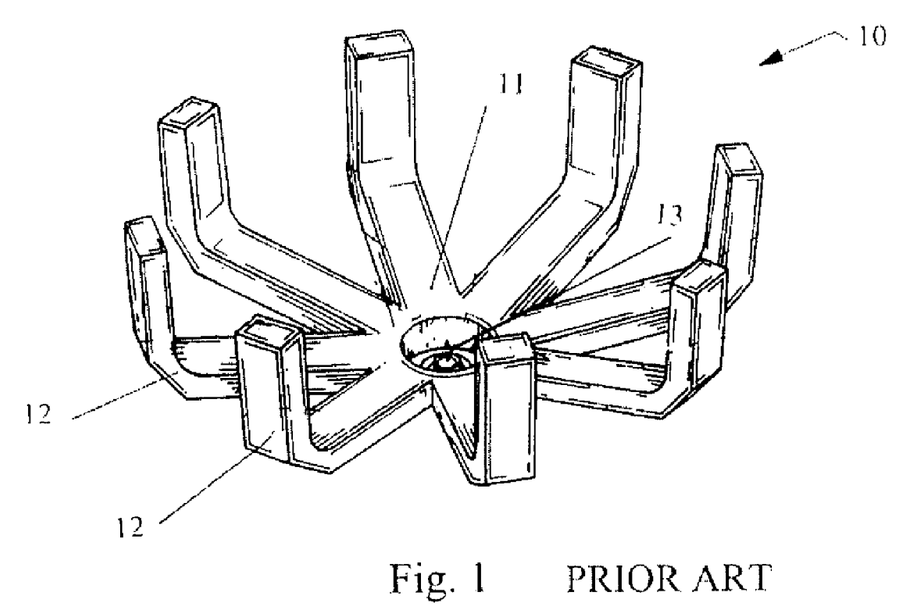
FIG. 1 is a perspective view of a prior art light assembly.

With reference to FIG. 1, a prior art lens assembly is illustrated and designated at 10. This lens assembly 10 is illustrated and described in U.S. patent application Ser. No. 11/288,518, which is commonly assigned to the assignee of the present application and which is herein incorporated by reference. The lens assembly 10 includes a hub 11 and a plurality of fingers 12 extending from the hub 11. Located in the center of the hub 11 is a light source, which is comprised of an LED surrounded by a near-field lens 13. The near-field lens 13 collects light from the LED (not shown) and redirects the light laterally toward the hub 11 of the lens assembly 10. The hub 11, in turn, collects and directs the light into the fingers 12 of the lens assembly.

While the lens 10 works well based upon its intended design and construction, it is desirable to have an assembly that collects and directs light from the LED in a more controlled manner in order to meet the increased anticipated demands of the automotive industry, while continuing to reduce cost.

In view of the above, it is apparent that there exists a need for a lighting system that decreases the number of LEDs necessary for use in the lighting system, while maintaining or increasing the level of light intensity with better direction control, and maintaining or increasing the ease of manufacturing.

SUMMARY

In satisfying the above need, as well as overcoming the enumerated drawbacks and other limitations of the related art, the present invention provides a light distribution assembly for use with a light source. The lens assembly includes an inner lens having an light-collecting face and a radial inner light-emitting face. The radial inner light-emitting face includes a plurality of collimators. The inner lens is configured to collect light rays from the light source through its light-collecting face and to emit at least a portion of the light rays radially through the collimators. The light distribution assembly also includes an outer light directing portion having a plurality of light-distributing faces. The light-distributing faces correspond to the collimators and are configured to distribute the light rays emitted from the collimators.

In another embodiment of the invention, a lens assembly is provided, having an inner lens as described above, and an outer lens. The outer lens includes a light-collecting face and a plurality of light-distributing faces. The light-collecting face is configured to collect the light rays emitted from the plurality of collimating features of the first light-emitting face of the inner lens and distribute the light rays through the plurality of light-distributing faces.

In yet another embodiment of the invention, the light distribution assembly is constructed as described above, but has an outer reflector instead of an outer lens. The reflector has a plurality of light-reflecting faces and is configured to reflect the light rays emitted from the collimating features of the first light-emitting face of the lens.

Further objects, features, and advantages of this invention will become readily apparent to persons skilled in the art after a review of the following description, with reference to the drawings and claims that are appended to and form a part of this specification.

DETAILED DESCRIPTION

Figure 2A:
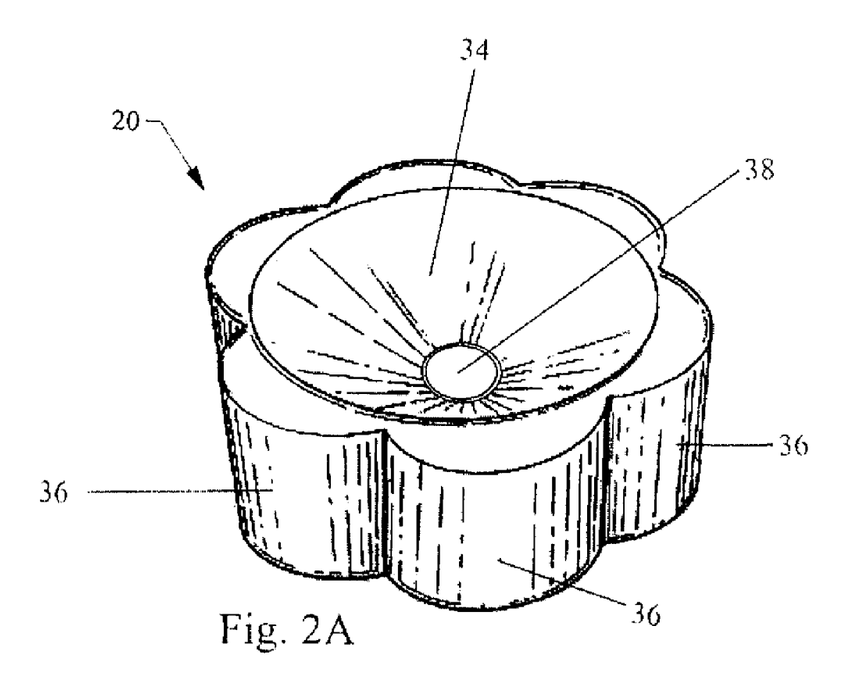
FIG. 2A is a first embodiment of an inner lens embodying the principles of the present invention.
Figure 2B:
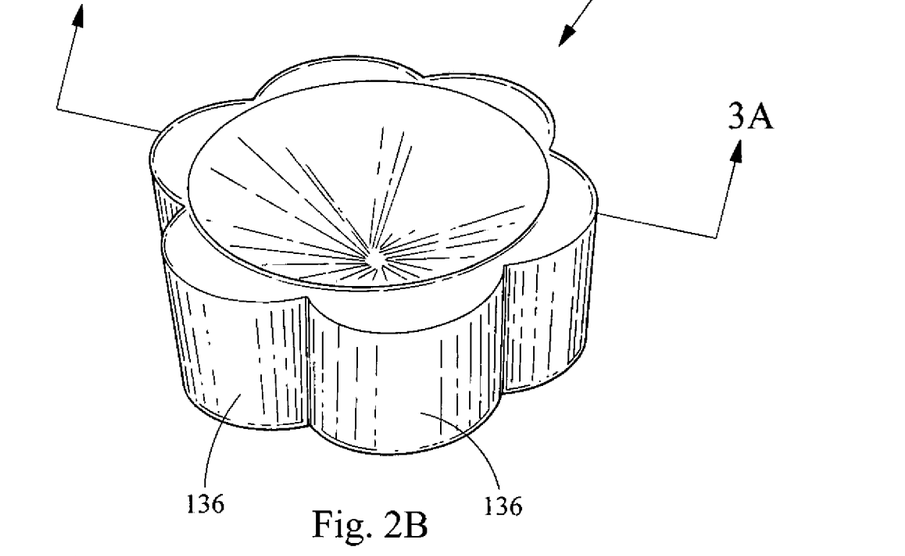
FIG. 2B is a second embodiment of an inner lens embodying the principles of the present invention.

Referring now to FIGS. 2A and 2B, inner lenses 20, 120 embodying the principles of the present invention are illustrated therein. The inner lenses 20, 120 are made of light-transmitting material and preferably are made of optical grade plastic, such as acrylic or polycarbonate, depending on whether the inner lenses 20, 120 are designed for use with high- or low-temperature applications.

Figure 3A:
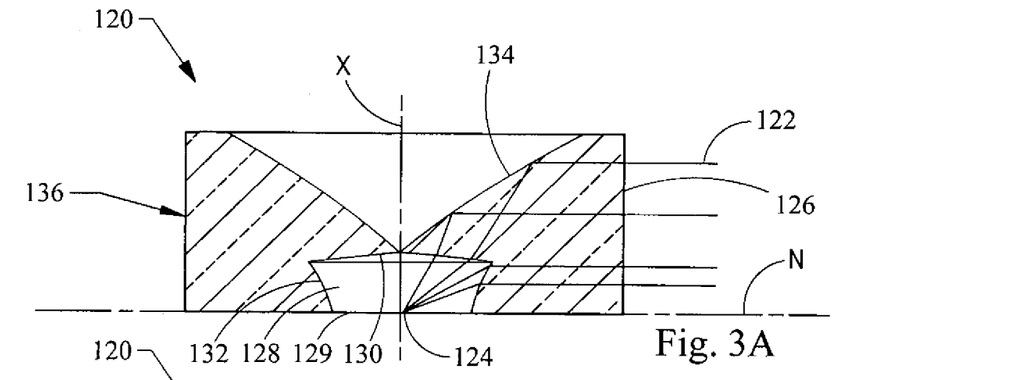
FIG. 3A is a sectional view of a first embodiment of the inner lens of FIG. 2B.
Figure 3B:
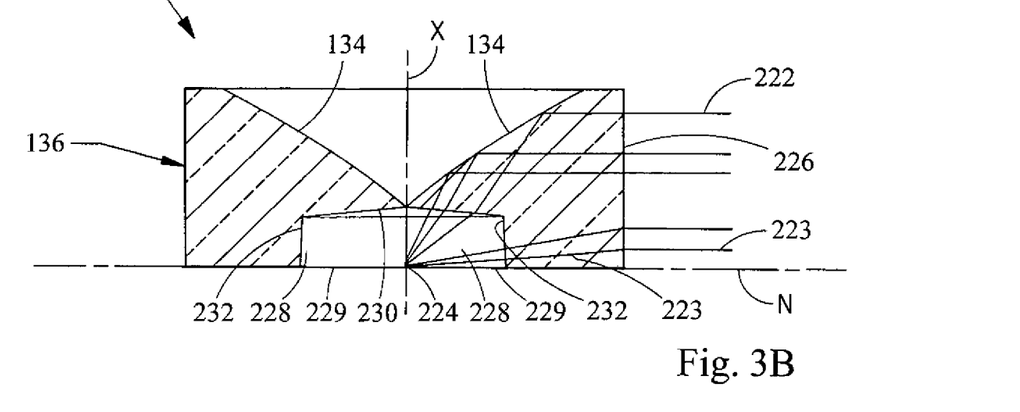
FIG. 3B is a sectional view of a second embodiment of the inner lens of FIG. 2B.

With reference to FIGS. 3A and 3B, cross-sectional views of two different embodiments of the inner lens 120 are shown. The inner lens 120 collects light 122, 222 from a light source 124, 224, such as an LED having a cone angle up to 180 degrees, and directs the light 122, 222 radially out of the side 126, 226 of the lens 120. The light source 124, 224 could alternatively be a cluster of LEDs or another type of light source.

As seen in FIG. 3A, the inner lens 120 has a light-collecting face defined by a pocket 128 having an open side 129. The light source 124 is disposed within the pocket 128. For clarity, FIG. 3A shows the light source 124 projecting light rays 122 only out of the right side of the lens 120. However, it should be understood that the light source 124 produces an identical, or nearly identical, array of light rays 122 through all 360 degrees around the hemispherical shape of the light source 124.

The pocket 128 is defined by a conical, axially-facing surface 130 surrounded by a cylindrical, radially-facing surface 132. The axially-facing surface 130 is shown as being slightly concave. In this embodiment, the slight concavity of the axially-facing surface 130 works in conjunction with a slanted, slightly convex reflecting surface 134 to direct the light rays 122 radially out of the inner lens 120, in a collimated manner. As apparent from FIGS. 2B and 3A, the reflecting surface 134 forms a generally curved cone-shaped depression into the lens 120 and is centered within the lens 120 such that the apex of the cone shape is axially aligned with the light source 124.

The directing of the light rays occurs because the light source 124 emits light rays 122 within the pocket 128 of the inner lens 120, and at least a portion of these light rays 122 strike the axially-facing surface 130. As the light rays 122 contact the axially-facing surface 130, they are refracted through the lens 120 toward the reflecting surface 134. Because the light rays 122 hit the reflective surface 134 at a very acute angle with respect to the tangential plane of the reflective surface 134, the light rays 122 are totally internally reflected. This causes the light rays 122 to reflect radially out of the side 126 of the lens 120, in a collimated manner. In other words, the light rays 122 contact the reflecting surface 134 at an angle in the range of angles that causes total internal reflection, instead of allowing refraction through the reflecting surface 134. The range of angles in which the light rays 122 must contact the surface 134 in order to be total internally reflected depends on the particular material that the lens is made of, as one having ordinary skill in the art will appreciate.

As one having ordinary skill in the art would also understand, the axially-facing surface 130 and the reflecting surface 134 could have configurations different from the configurations shown in FIG. 3A and those configurations could also produce a collimated, radial emission of the light rays 122 as described above.

The radially-facing surface 132 of the pocket 128 is a curved, slightly convex, slanted surface, with the inner portions of the surface 132 being displaced more radially outward than the portions of the surface 132 located adjacent to the opening 129. This configuration is designed and oriented in such a way that it causes the light rays 122 that are incident on the radially-facing surface 132 to be emitted from the lens 120 in a collimated manner. Again, this occurs because as the light source 124 emits light rays 122, a portion of the light rays 122 are incident on the radially-facing surface 132. These light rays 122 are refracted through the lens 120, and they exit the side 126 of the lens 120, in a collimated manner.

With reference to FIG. 3B, a cross-section of a second embodiment of the lens 120 is shown. This embodiment is constructed the same as the embodiment of FIG. 2A except for the construction of the pocket 228, and for convenience, common elements bear common reference numerals therewith. Accordingly, the inner lens 120 has a light-collecting face defined by the pocket 228. The fight source 224 is disposed within the open side 229 of the pocket 228.

The pocket 228 is defined by an axially-facing surface 230 surrounded by a radially-facing surface 232. The concave, axially-facing surface 230 is substantially of the same construction as the axially-facing surface 130 of FIG. 3A, and such discussion of the axially-facing surface 130 is incorporated herein by reference.

The cylindrical, radially-facing surface 232 of the pocket 228 has a straight, tapering shape with the inner portions of the cylindrical, radially-facing surface 232 defining a dimension (a diameter) that is less than that defined by those portions of the radially-facing surface 232 adjacent to the opening 229 of the pocket 228. As a result of its construction, the radially-facing surface 232 causes the lower light rays 223 to be emitted from the lens 120 in a slightly-less-than-collimated manner. This occurs because, as the light source 224 emits lower light rays 223 (lower light rays 223 are defined as light rays that are incident on the radially-facing surface 232, as opposed to the axially-facing surface 230), the lower light rays 223 change direction only slightly at the surfaces 232, 226, and therefore, they exit the side 226 of the lens 120 at angles slightly deviated from collimation. In other words, the lower light rays 223 emerging from the radially-facing surface 232 continue through to the side 226 of the lens and have a vertical inclination as they depart from the side 226 of the lens 120.

It is acceptable that the lower light rays 223 have a slight vertical deviation from collimation, because the lower light rays 223 will still be substantially directed radially from the lens 120. The configuration of the pocket 228 of FIG. 3B requires much simpler manufacturing tooling than the lens 120 of FIG. 3A and eliminates the die-lock problem that may occur when manufacturing the lens 120 of FIG. 3A.

It should be noted that one having ordinary skill in the art would understand that this deviation from collimation can be corrected if desired by modifying the lower portion of the side 226 to have a correction curvature or by modifying the receiving surfaces of any other second outer lens or reflectors surrounding the side 226.

Figure 3C:
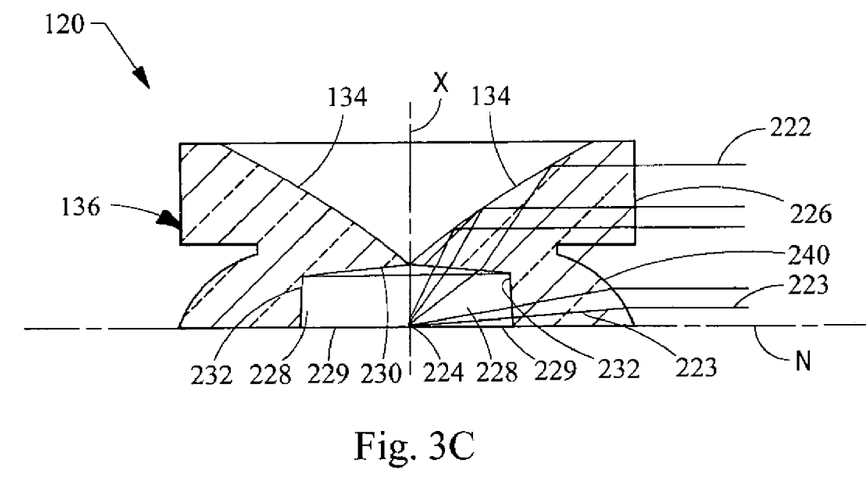
FIG. 3C is a sectional view of a third embodiment of the inner lens of FIG. 2B.

For example, with reference to FIG. 3C, the lens 120 has an outer curvature 240 to collimate the lower light rays 223. More particularly, the lens 120 of FIG. 3C has a pocket 228 substantially the same as the pocket 228 of FIG. 3B. As such, the lens 120 has an inner axially-facing surface 230 surrounded by an inner radially-facing surface 232. The inner-radially facing surface 232 has a straight, tapering shape, which does not perfectly collimate the lower light rays 223. However, the lens 120 of FIG. 3C has an outer curvature 240 that collimates the light rays 223. The inner lens 120 is a body of revolution symmetrical about an axis of revolution X. The axis of revolution is perpendicular to a normal plane N that is coplanar with the open side 229 of the pocket 228. The outer curvature 240 curves inward from the normal plane N toward the axis of revolution X. In this way, the outer curvature 240 is configured to direct the lower light rays 223, which are incident on the outer curvature 240, in a direction parallel to the normal plane N.

The outer curvature 240 could have other configurations without falling beyond the spirit and scope of the present invention. For example, the outer curvature 240 could resemble a curved foot extending from lens 120. As such, the outer curvature 240 could start at a point on the normal plane N that is farther from the rotational axis X than the side 226, and curve inward toward the side 226 of the lens 120.

Figure 4:
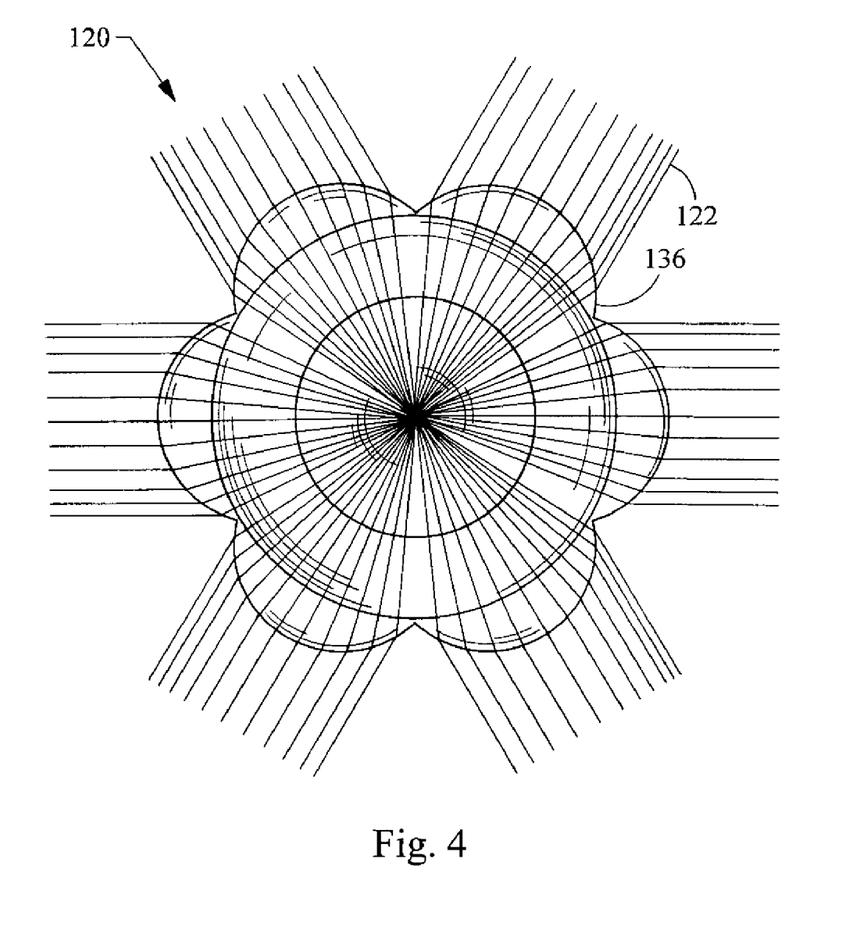
FIG. 4 is a plan view of the inner lens of FIG. 2B, illustrating light rays being directed radially outward therethrough.

With reference to FIGS. 2A and 2B, a plurality of collimating features 36, 136 are disposed circumferentially about the radial sides of the lenses 20, 120. The collimating features 36, 136 may be formed as an integral part of the lens 20, 120, as shown in the drawings, or they may be formed separately from the lens 20 and attached thereto. With reference to FIG. 4, a top, plan view of the lens 120 of FIG. 2B is illustrated. As seen therein, light rays 122 are directed radially out of the lens 120. The collimating features 136 are configured as cylindrical portions extending axially along the sides of the lens. More specifically, in this embodiment, the collimating features 136 are convex, petal-shaped surface optics. It should be understood, however, that the collimating features 136 could have other configurations, such as concave, petal-shaped surface optics. The collimating features 36, 136 cause the light rays 122 to be emitted from about the lens 120 as periodic group of collimated rays 122, as opposed to radial rays continuous about the lens, the latter being the way in which the light rays would be emitted without some form of collimating features 136.

With reference to FIG. 2A, the inner lens 20 may also be configured to emit light rays 22 axially. In achieving this, inner lens 20 may include a small circular disk lens located axially just above the LED and a beam-spreading pillow 38 constructed in the center of the reflecting face 34. With this configuration, a portion of the light rays emitted from a light source located within the pocket of the lens 20 will be emitted generally axially through the circular disk lens and out of the beam-spreading pillow 38. The rest of the light rays will be substantially emitted radially through the collimating features 36. In this way, a single light source located within the pocket of the lens 20 will provide a three-dimensional lit appearance.

Figure 5:
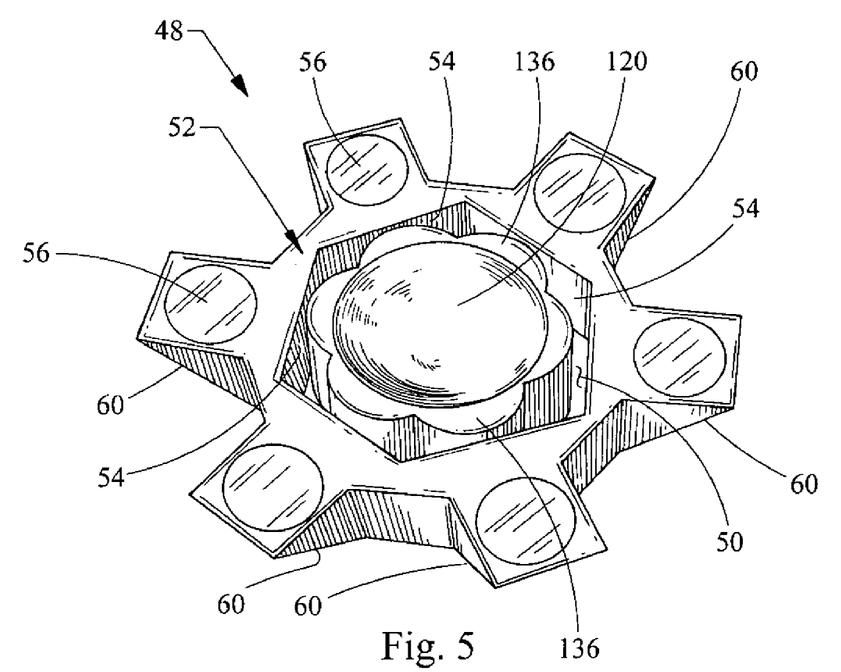
FIG. 5 is a perspective view of the inner lens of FIG. 2B, disposed within the center of an outer lens embodying the principles of the present invention.

With reference to FIG. 5, as lens assembly 48 is illustrated therein. An inner lens 120, like that seen in FIG. 2B, is disposed within a hollow center 50 of an outer lens 52. The outer lens 52 is preferably separate and distinct from the inner lens 120. The outer lens 52 has a plurality of light-collecting faces 54 and a plurality of light-distributing faces 56. The light-collecting faces 54 are configured to collect the light rays 122 emitted from the plurality of collimating features 136 of the inner lens 120.

The light-collecting faces 54 correspond in number to the plurality of light-distributing faces 56 and are also provided so as to correspond to the number of collimating features 136 on the inner lens 120. As such, the light rays 122 are collimated periodically along the perimeter of the inner lens 120 and directed toward the light-collecting faces 54, which further direct the light rays 122 to the light distributing faces 56. The light rays 122 therefore enter the light-collecting faces 54 and strike the slanted walls 60, where they are totally internally reflected and directed toward the light-distributing faces 56 and out of the outer lens 52. In this way, the light rays 122 are sent to the light-distributing faces 56 without much deviation. The inner lens 120 and outer lens 52 are designed to collect a substantial portion of the light rays 122 emitted from the light source 124 and distribute the light rays 122 out through the plurality of light-distributing faces 56, giving the lens assembly 48 an appearance of multiple light sources, using only a single LED.

While six light-distributing faces 56 are shown here, it will be appreciated that the number of light-distributing faces 56 can be varied as desired and as design parameters dictate. Additionally, the light-distributing faces 56 may include spreading pillow optics or other optics. The size of the spreading pillow optics could be varied, based on styling desires.

In an alternative embodiment, the outer lens 52 could have a single circular light-collecting face, similar to that of FIG. 1, instead of the plurality of light-collecting faces 54. The single circular light-collecting face would be configured to collect light 122 emitted from the collimators 136 and distribute the light 122 through the light-distributing faces 56, wherein the light-distributing faces 56 would be configured to correspond to the collimators 136.

Figure 6:
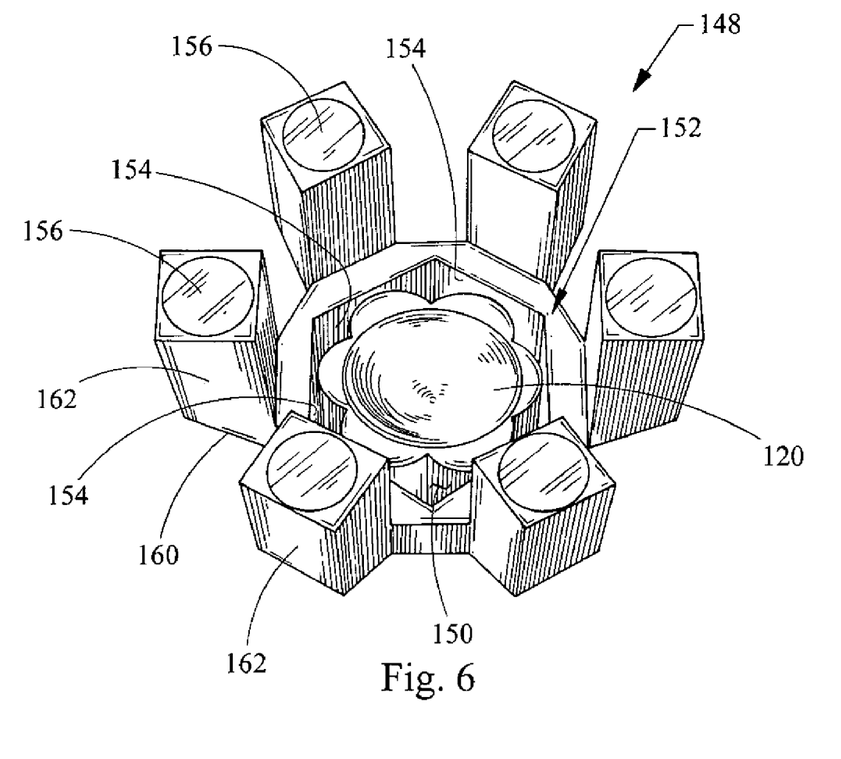
FIG. 6 is a perspective view of the inner lens of FIG. 2B, disposed within the center of another embodiment of an outer lens incorporating the principles of the present invention.

Referring to FIG. 6, another embodiment of a lighting assembly 148 is illustrated therein. Like the prior embodiment shown in FIG. 5, an inner lens 120 is disposed in the hollow center 150 of an outer lens 152. The outer lens 152 includes a plurality of light-collecting faces 154 and a plurality of light-distributing faces 156. The light-collecting faces 154 are configured to collect the light rays 122 emitted from the plurality of collimating features 136 of the inner lens 120, and accordingly correspond (in number and location) to the collimating features 136.

In operation, the light rays 122 enter the light-collecting faces 154, strike the slanted wall 160, and are totally internally reflected through the shafts 162 toward the corresponding light-distributing faces 156. Upon reaching the light-distributing faces 156, the light rays 122 are emitted from the outer lens 152. Again, in this way, a single light source 24, 124, 224 located in the pocket 28, 128, 228 of the inner lens 20, 120 is made to appear as multiple lights. This configuration may also be provided to have a three-dimensional appearance, as the shafts 162 may be provided in various lengths.

Figure 7:
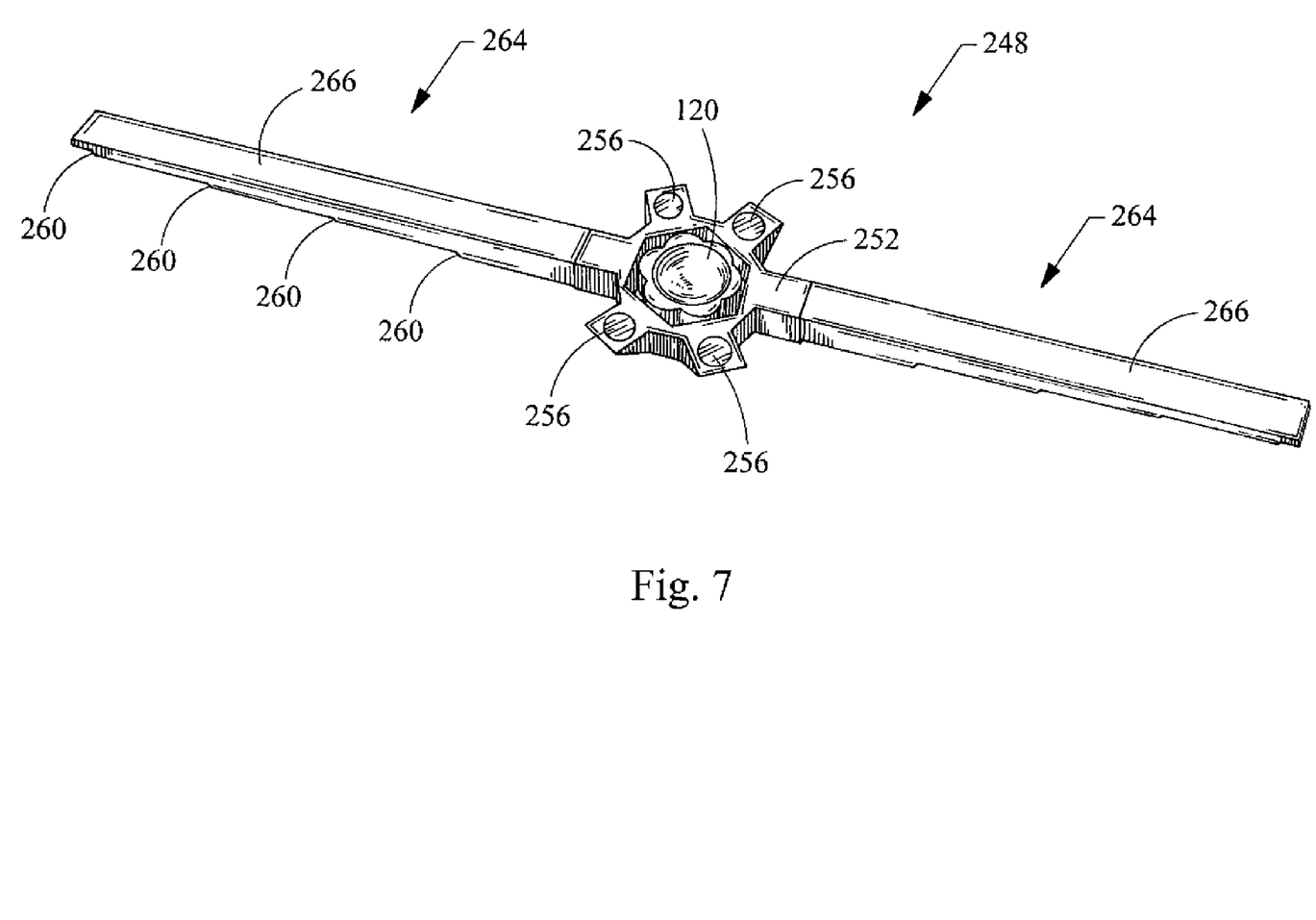
FIG. 7 is a perspective view of the inner lens of FIG. 2B, disposed within the center of a further embodiment of an outer lens in accordance with the principles of the present invention.

Referring to FIG. 7, another embodiment of a lighting assembly 248 is illustrated therein. The lighting assembly 248 has an inner lens 120 and outer lens 252, which work together, as previously described with respect to the previous embodiments, to give the lens assembly 248 a multiple light source appearance with a single LED. Accordingly, the discussion of the previous embodiments, as it relates to common features, is herein incorporated by reference. In this embodiment, two of the light-distributing faces 256 are replaced with light manifolds, or light pipes, 264. As light rays 122 are emitted from the petal-shaped collimating features 136 of the inner lens 120 and are collected by the light-collecting face 254, a set of the light rays 122 will enter each of the light manifolds 264. The light rays 122 within the light pipes 264 will strike the light-reflecting faces 260, located inside and along the length of the light manifolds 264, which will cause the light rays 122 to be totally internally reflected toward a light-emitting surface 266 and emitted therefrom. As shown, the light-emitting surfaces 266 extend along the length of the light manifolds 264. In this way, a single light source 24, 124, 224 may be used to distribute light 22, 122, 222 through numerous light-distributing faces 256 and along the surfaces of multiple light manifolds 264.

The light manifold 264 could further include serrations along its length, between the light-reflecting faces 260, which would further deflect the light rays 122 out of the light-emitting surfaces 266. The light-emitting surfaces 266 may further include pillow optics to spread out the final light beam, if desired.

Figure 8:
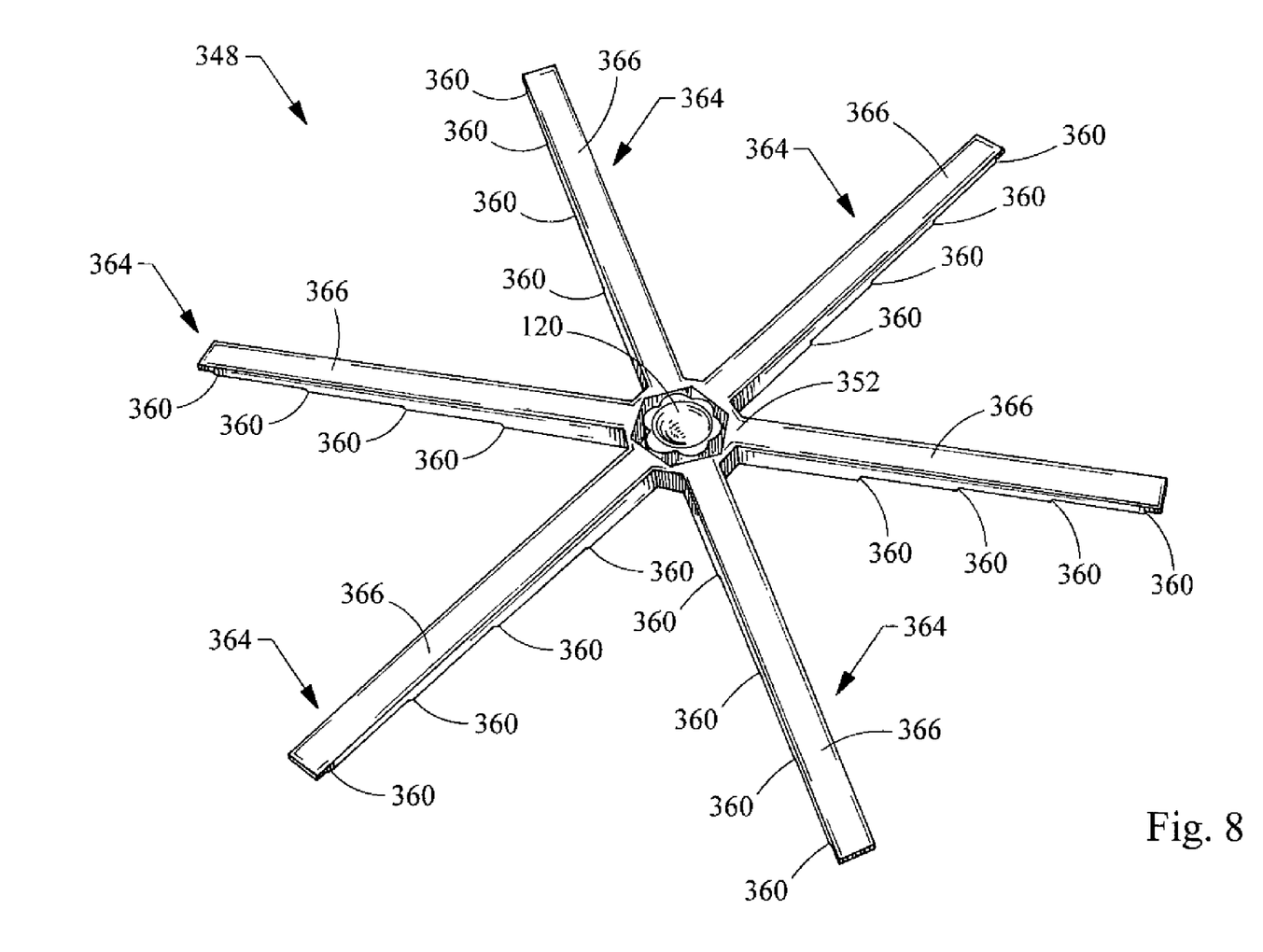
FIG. 8 is a perspective view of the inner lens of FIG. 2B, disposed within the center of still another embodiment of an outer lens incorporating the principles of the present invention.

With reference to FIG. 8, another lighting assembly 348 is illustrated therein and is similar in construction to the embodiment of FIG. 7. This embodiment differs in that each of the light-distributing faces 256 have been replaced with light manifolds 364 having light-reflecting faces 360 and light-distributing surfaces 366.

Figure 9A:
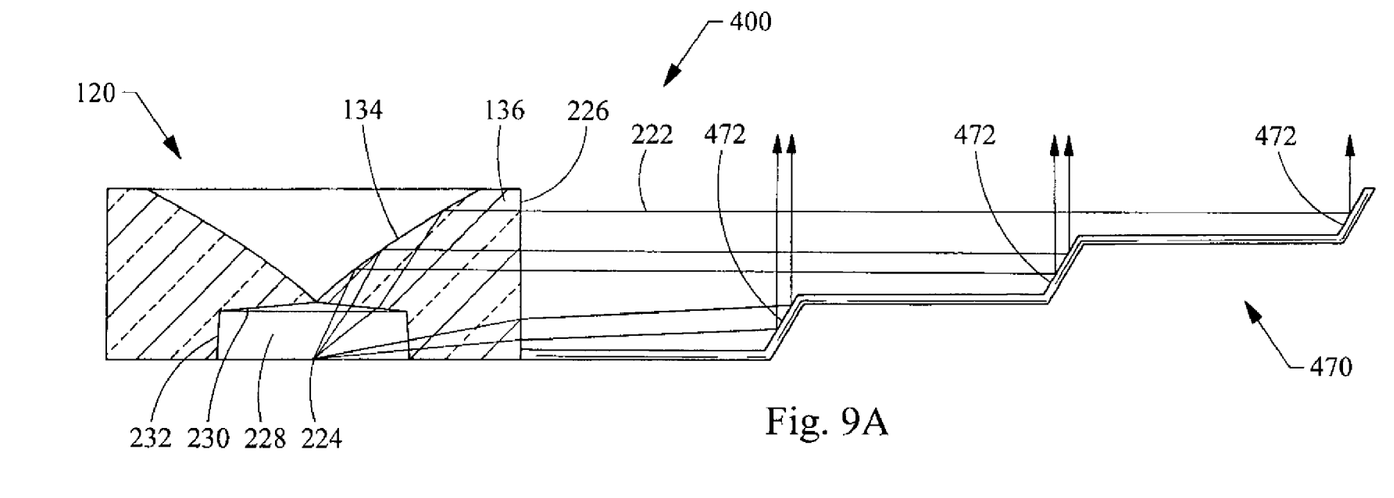
FIG. 9A is a partial cross-sectional view of the inner lens of FIG. 3B, disposed within the center of one embodiment of an outer reflector in accordance with the principles of the present invention.
Figure 9B:
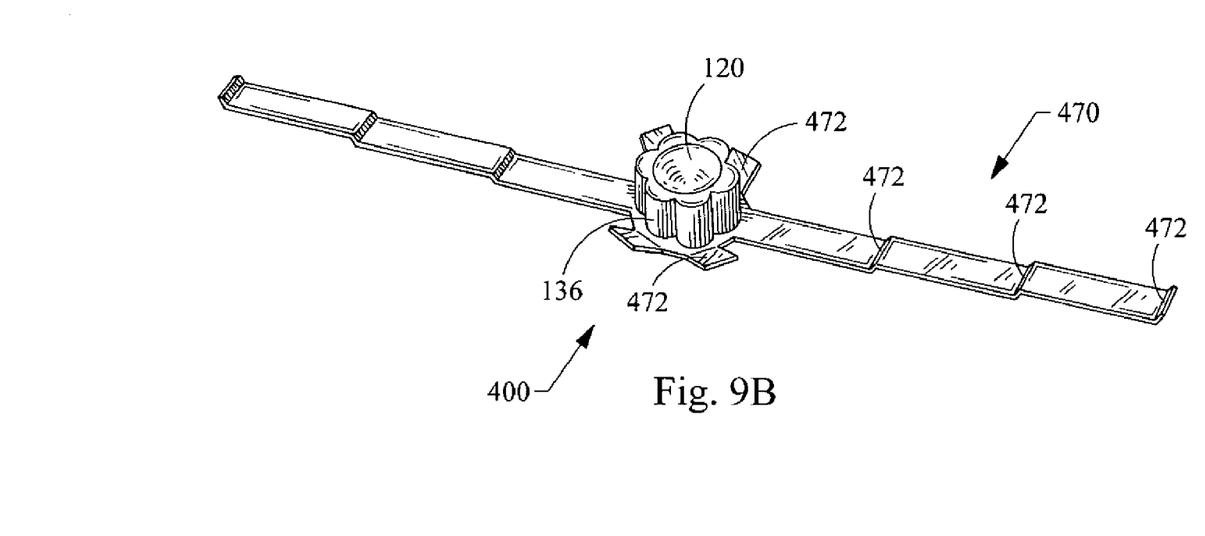
FIG. 9B is a perspective view of the inner lens and outer reflector of FIG. 5A.

With reference to FIG. 9A-9B, a light distribution assembly 400 for use with a light source 224 is illustrated. The light distribution assembly 400 includes an inner lens 120 that is substantially the same as the lens of FIG. 3B. In the alternative, the lens could be the lens of FIG. 2A or 3A, or any other suitable lens.

In this assembly 400, as the light rays 222 are emitted from the collimating features 136 on the side 226 of the inner lens 120, the light rays 222 are directed toward a reflector 470 (as opposed to an outer lens), which surrounds the inner lens 120 in a similar way as the outer lens of FIG. 7. The reflector 470 has a plurality of light-reflecting faces 472, which reflect the light rays 222. The light-reflecting faces 472 are aligned with the collimating features 136 of the inner lens 120, in order to reflect a substantial portion of the light rays 222 emitted from the inner lens 120.

Figure 10A:
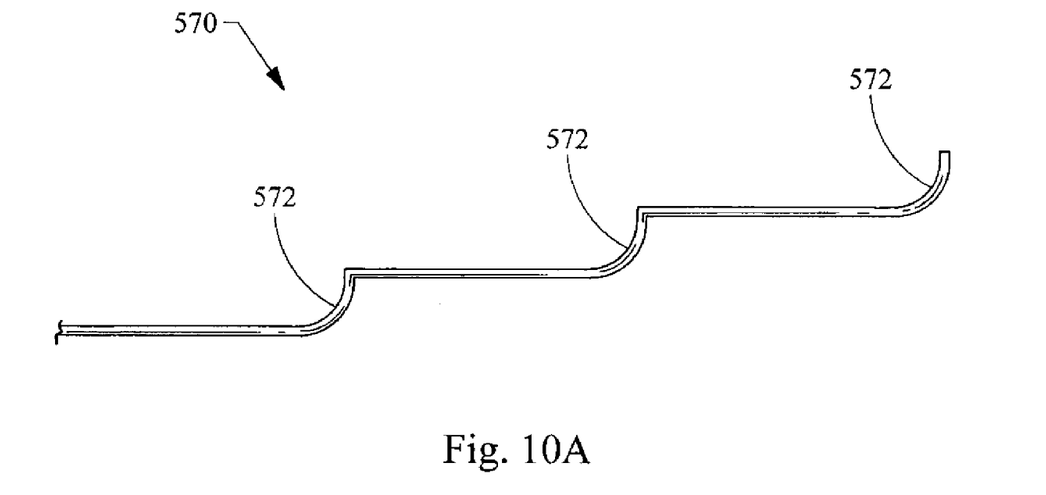
FIG. 10A is a partial cross-sectional view of another embodiment of an outer reflector embodying the principles of the present invention.

With reference to FIG. 10A, a cross-section of another reflector 570 is illustrated therein. In this embodiment, light-reflecting surfaces 572 of the reflector 570 have concave shapes (instead of flat faces), which cause beam spreading of the light rays that contact the light-reflecting surfaces 572.

Figure 10B:
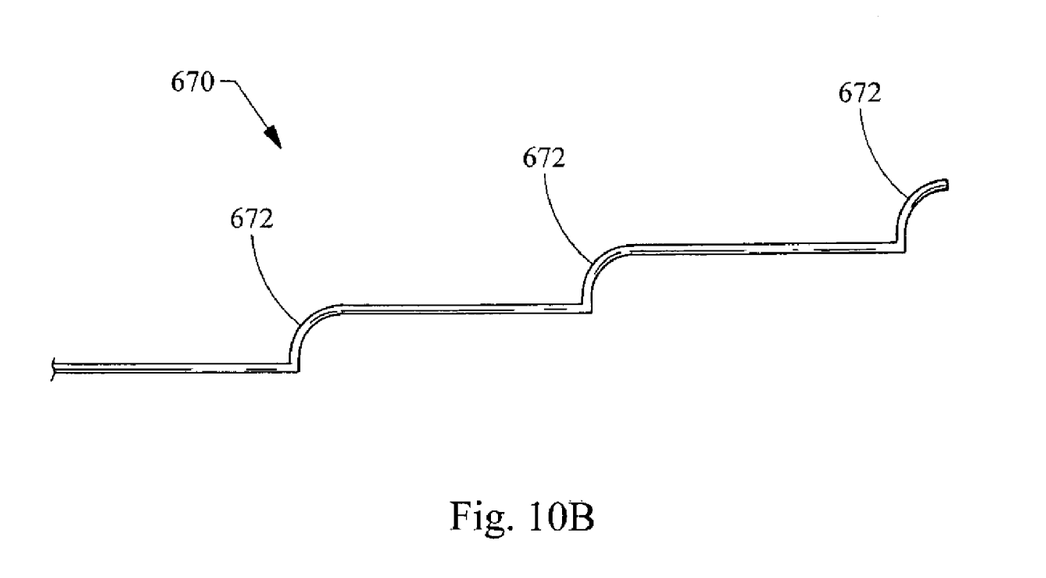
FIG. 10B is a partial cross-sectional view of an additional embodiment of an outer reflector incorporating the principles of the present invention.

FIG. 10B illustrates a cross-section of another reflector 670. In this embodiment, light-reflecting surfaces 672 have convex shapes, which cause beam spreading of the light rays that contact the light-reflecting surfaces 672.

As a person skilled in the art will readily appreciate, the above description is meant as an illustration of implementation of the principles of this invention. This description is not intended to limit the scope or application of this invention in that the invention is susceptible to modification, variation, and change, without departing from spirit of this invention, as defined in the following claims.

We claim:

1. A lens assembly for use with a light source, the lens assembly comprising:
   an inner lens having an inner light-collecting face and a radial inner light-emitting face, the radial inner light-emitting face including a plurality of collimators, the inner lens being configured to collect light rays from the light source through its light-collecting face and emit at least a portion of the light rays radially through the collimators, wherein the inner light-collecting face defines a pocket formed within the inner lens, the pocket having an open end; and
   an outer lens having a plurality of outer light-collecting faces and a plurality of outer light-distributing faces, the light-collecting faces corresponding to the collimators and being configured to collect the light rays emitted from the collimators, the outer lens being further configured to distribute the light rays collected by the outer light-collecting faces through the outer light-distributing faces.

2. The lens assembly of claim 1, wherein the pocket is defined by an axial surface surrounded by a radial surface.

3. The lens assembly of claim 2, wherein the axial surface is generally concave.

4. The lens assembly of claim 2, wherein the radial surface extends from the axial surface toward the open end of the pocket, the radial surface being an inwardly convex surface of rotation.

5. The lens assembly of claim 2, wherein the radial surface extends from the axial surface toward the open end of the pocket, the radial surface being a tapered cylindrical surface.

6. A lens assembly for use with a light source, the lens assembly comprising:
   an inner lens having an inner light-collecting face and a radial inner light-emitting face, the radial inner light-emitting face including a plurality of collimators, the inner lens being configured to collect light rays from the light source through its light-collecting face and emit at least a portion of the light rays radially through the collimators; and
   an outer lens having a plurality of outer light-collecting faces and a plurality of outer light-distributing faces, the light-collecting faces corresponding to the collimators and being configured to collect the light rays emitted from the collimators, the outer lens being further configured to distribute the light rays collected by the outer light-collecting faces through the outer light-distributing faces, wherein the outer lens comprises at least one light pipe having a plurality of light-reflecting faces being located along the length the light pipe.

7. A light distribution assembly for use with a light source, the light distribution assembly comprising:
   a lens having a light-collecting face and a radial light-emitting face, the radial light-emitting face including a plurality of collimators, the lens being configured to collect light rays from the light source through light-collecting face and emit at least a portion of the light rays radially through the collimators; and
   a reflector having a plurality of light-reflecting faces corresponding to the collimators, the light-reflecting faces configured to reflect the light rays emitted from the collimators.

8. The light distribution assembly of claim 7, wherein each of the light-reflecting faces of the reflector is aligned with one of the collimators.

9. The light distribution assembly of claim 7, wherein the collimators have convex radial surfaces.

10. The light distribution assembly of claim 7, wherein the lens further includes an axial light-emitting face to emit at least a portion of the light rays axially.

11. The light distribution assembly of claim 7, wherein the light-collecting face defines a pocket formed within the lens, the pocket having an open end.

12. The light distribution assembly of claim 11, wherein the pocket is defined by an axial surface surrounded by a radial surface.

13. The light distribution assembly of claim 12, wherein the axial surface is generally concave.

14. The light distribution assembly of claim 12, wherein the radial surface extends from the axial surface toward the open end of the pocket and defines a straight surface of rotation increasing in division adjacent to the open end.

15. The light distribution assembly of claim 12 wherein the radial surface is a convex surface of rotation.

16. The lens assembly of claim 5, wherein the inner lens is a body of revolution symmetrical about an axis of revolution, and wherein the inner lens has an outer curvature that curves inward from a normal plane toward the axis of revolution, the normal plane being coplanar with the open side of the pocket and perpendicular to the axis of revolution, the outer curvature being configured to direct light rays incident thereon in a direction parallel to the normal plane.

* * * * *